United States Patent [19]
Brown

[11] Patent Number: 5,599,055
[45] Date of Patent: Feb. 4, 1997

[54] INSERT FOR A PICKUP TRUCK BED

[76] Inventor: James F. Brown, 11 N. Adler, Orlando, Fla. 32807

[21] Appl. No.: 546,707

[22] Filed: Oct. 23, 1995

[51] Int. Cl.$^6$ .................................................. B62D 33/02
[52] U.S. Cl. ........................... 296/39.2; 296/37.6; 410/80; 410/90; 410/97
[58] Field of Search .............................. 296/39.1, 39.2, 296/37.6; 410/80, 90, 97, 117, 118, 84, 85

[56] References Cited

U.S. PATENT DOCUMENTS

| | | | |
|---|---|---|---|
| 3,312,181 | 4/1967 | Davidson | 410/97 |
| 4,339,148 | 7/1982 | Smith et al. | 410/80 X |
| 4,917,429 | 4/1990 | Giger | 296/37.6 |
| 5,131,709 | 7/1992 | Spica | 296/39.1 X |
| 5,265,993 | 11/1993 | Wayne | 296/39.2 X |
| 5,328,310 | 7/1994 | Lockney | 410/97 |

*Primary Examiner*—Joseph D. Pampe

[57] ABSTRACT

An insert for a pickup truck bed comprised of a truck bed insert comprising a plurality of longitudinally and latitudinally extending rib members. The longitudinally and latitudinally extending rib members together forming a plurality of square openings. The truck bed insert is dimensioned to be received within a truck bed of a pickup truck. A plurality of attachment brackets are adapted for securement of the insert within a pickup truck bed. Lock mechanisms have a key insert through an upper portion. The lock mechanisms have lugs selectively extending outwardly of opposing sides of a lower portion thereof to engage slots within a lower portion of the longitudinally extending rib members of the insert for a truck bed whereby the lugs cooperate with the key insert to selectively engage or disengage the slots.

6 Claims, 3 Drawing Sheets

INSERT FOR A PICKUP TRUCK BED

BACKGROUND OF THE INVENTION

1. Field of the Invention

The present invention relates to an insert for a pickup truck bed and more particularly pertains to protecting a truck bed from damage while providing a customized storage system with an insert for a pickup truck bed.

2. Description of the Prior Art

The use of pickup truck bed liners is known in the prior art. More specifically, pickup truck bed liners heretofore devised and utilized for the purpose of lining a pickup truck bed are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,974,895 to Davenport discloses a reinforced truck bed liner.

U.S. Pat. No. 4,161,335 to Nix et al. discloses a truck bed liner.

U.S. Pat. No. 3,881,768 to Nix discloses a pickup truck bed liner and protector.

U.S. Pat. No. 4,767,149 to Rye discloses a pickup truck bed liner.

U.S. Pat. No. 4,890,874 to Davis discloses a liner for a pickup truck bed.

While these devices fulfill their respective, particular objective and requirements, the aforementioned patents do not describe an insert for a pickup truck bed for protecting a truck bed from damage while providing a customized storage system.

In this respect, the insert for a pickup truck bed according to the present invention substantially departs from the conventional concepts and designs of the prior art, and in doing so provides an apparatus primarily developed for the purpose of protecting a truck bed from damage while providing a customized storage system.

Therefore, it can be appreciated that there exists a continuing need for new and improved insert for a pickup truck bed which can be used for protecting a truck bed from damage while providing a customized storage system. In this regard, the present invention substantially fulfills this need.

SUMMARY OF THE INVENTION

In the view of the foregoing disadvantages inherent in the known types of pickup truck bed liners now present in the prior art, the present invention provides an improved insert for a pickup truck bed. As such, the general purpose of the present invention, which will be described subsequently in greater detail, is to provide a new and improved insert for a pickup truck bed and method which has all the advantages of the prior art and none of the disadvantages.

To attain this, the present invention essentially comprises a truck bed insert comprising a plurality of longitudinally and latitudinally extending rib members. The longitudinally and latitudinally extending rib members together forming a plurality of square openings. The truck bed insert is dimensioned to be received within a truck bed of a pickup truck. The device includes a plurality of attachment brackets. Each of the attachment brackets has a U-shaped configuration with a pair of outwardly extending flange portions integral with free ends thereof. The attachment bracket is adapted for inverted coupling over a segment of the longitudinally rib members of the truck bed insert. The flange portions have apertures formed therethrough for the receipt of securement screws for securement of the insert within a pickup truck bed. The device includes a tool box having an upper surface and a lower surface. The upper surface has a lid hingedly secured thereto. The lower surface has lock mechanisms secured to four corners thereof. The lock mechanisms have a key insert through an upper portion thereof. The lock mechanisms have lugs selectively extending outwardly of opposing sides of a lower portion thereof to engage slots within a lower portion of the longitudinally extending rib members of the insert for a truck bed whereby the lugs cooperate with the key insert to selectively engage or disengage the slots. A cargo net has lock mechanisms secured to four corners thereof. The lock mechanisms have a key insert through an upper portion. The lock mechanisms have lugs selectively extending outwardly of opposing sides of a lower portion thereof to engage slots within a lower portion of the longitudinally extending rib members of the insert for a truck bed whereby the lugs cooperate with the key insert to selectively engage or disengage the slots. A divider wall has lock mechanisms secured to lower corners thereof. The lock mechanisms have a key insert through an upper portion. The lock mechanisms have lugs selectively extending outwardly of opposing sides of a lower portion thereof to engage slots within a lower portion of the longitudinally extending rib members of the insert for a truck bed whereby the lugs cooperate with the key insert to selectively engage or disengage the slots.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved insert for a pickup truck bed which has all the advantages of the prior art pickup truck bed liners and none of the disadvantages.

It is another object of the present invention to provide a new and improved insert for a pickup truck bed which may be easily and efficiently manufactured and marketed.

It is a further object of the present invention to provide a new and improved insert for a pickup truck bed which is of durable and reliable construction.

An even further object of the present invention is to provide a new and improved insert for a pickup truck bed which is susceptible of a low cost of manufacture with regard to both materials and labor, and which accordingly is then susceptible of low prices of sale to the consuming public, thereby making such an insert for a pickup truck bed economically available to the buying public.

Still yet another object of the present invention is to provide a new and improved insert for a pickup truck bed which provides in the apparatuses and methods of the prior art some of the advantages thereof, while simultaneously overcoming some of the disadvantages normally associated therewith.

Even still another object of the present invention is to provide a new and improved insert for a pickup truck bed for protecting a truck bed from damage while providing a customized storage system.

Lastly, it is an object of the present invention to provide a new and improved insert for a pickup truck bed comprised of a truck bed insert comprising a plurality of longitudinally and latitudinally extending rib members. The longitudinally and latitudinally extending rib members together forming a plurality of square openings. The truck bed insert is dimensioned to be received within a truck bed of a pickup truck. A plurality of attachment brackets are adapted for securement of the insert within a pickup truck bed. Lock mechanisms have a key insert through an upper portion. The lock mechanisms have lugs selectively extending outwardly of opposing sides of a lower portion thereof to engage slots within a lower portion of the longitudinally extending rib members of the insert for a truck bed whereby the lugs cooperate with the key insert to selectively engage or disengage the slots.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

With reference now to the drawings, and in particular, to FIGS. 1–6 thereof, the preferred embodiment of the new and improved insert for a pickup truck bed embodying the principles and concepts of the present invention and generally designated by the reference number 10 will be described.

Specifically, it will be noted in the various Figures that the device relates to a new and improved insert for a pickup truck bed for protecting a truck bed from damage while providing a customized storage system. In its broadest context, the device consists of a truck bed insert, a plurality of attachment brackets, a tool box, a cargo net, and a divider wall. Such components are individually configured and correlated with respect to each other so as to attain the desired objective.

Figure 1:
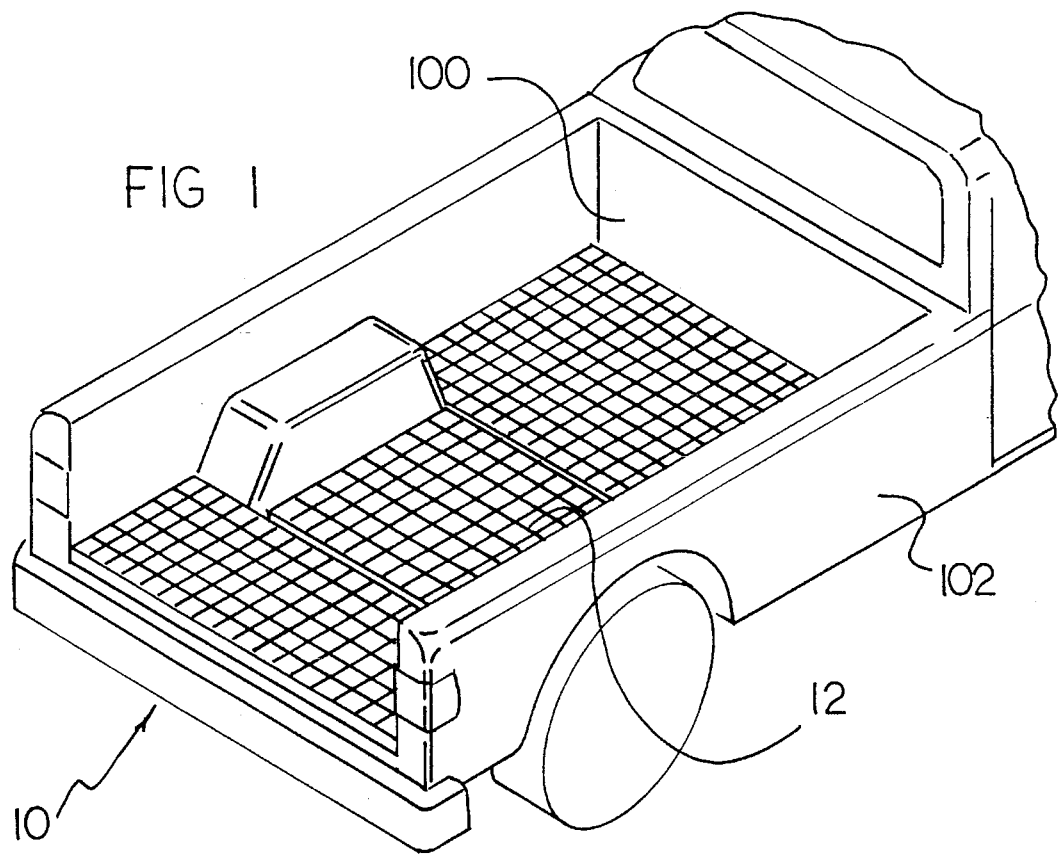
FIG. 1 is a perspective view of the preferred embodiment of the insert for a pickup truck bed constructed in accordance with the principles of the present invention.

The device 10 includes a truck bed insert 12 comprising a plurality of longitudinally 14 and latitudinally 16 extending rib members. The longitudinally 14 and latitudinally 16 extending rib members together forming a plurality of square openings 18. As best illustrated in FIG. 1, the truck bed insert 12 is dimensioned to be received within a truck bed 100 of a pickup truck 102. The insert 12 can be constructed of aluminum or plastic. Each of the square openings 18 would measure one inch in length by one inch in width, as well as one inch in depth in a preferred embodiment. A range of sizes would be produced to fit various sizes and models of truck beds. A chart could accompany the device 10 for consumer convenience and accurate sizing. The longitudinally 14 extending rib members would preferably be positioned slightly higher than the latitudinally 16 extending rib members to facilitate the loading and unloading of heavy and awkward objects into the truck bed 100. The insert 12 could be constructed so that more than one insert 12 would be used to cover the entire surface of the truck bed 100.

Figure 2:
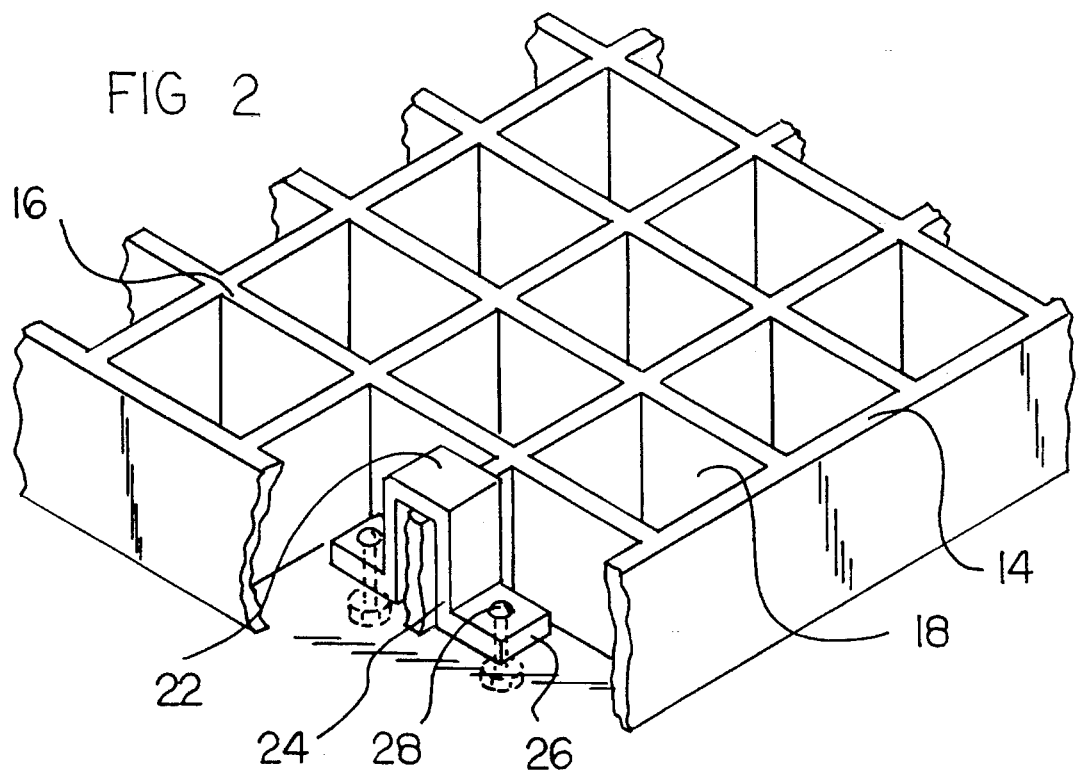
FIG. 2 is a partial perspective view of the present invention illustrating the attachment bracket.

The device 10 includes a plurality of attachment brackets 22. The attachment brackets 22 are best illustrated in FIG. 2. Each of the attachment brackets 22 has a U-shaped configuration with a pair of outwardly extending flange portions 24 integral with free ends 26 thereof. The attachment bracket 22 is adapted for inverted coupling over a segment of the longitudinally 14 rib members of the truck bed insert 12. The flange portions 24 have apertures formed therethrough for the receipt of securement screws 28 for securement of the insert 12 within a pickup truck bed 100. The attachment brackets 22 would be positioned at selective areas of the insert 12 to safely secure the insert 12 within the pickup truck bed 100.

Figure 3:
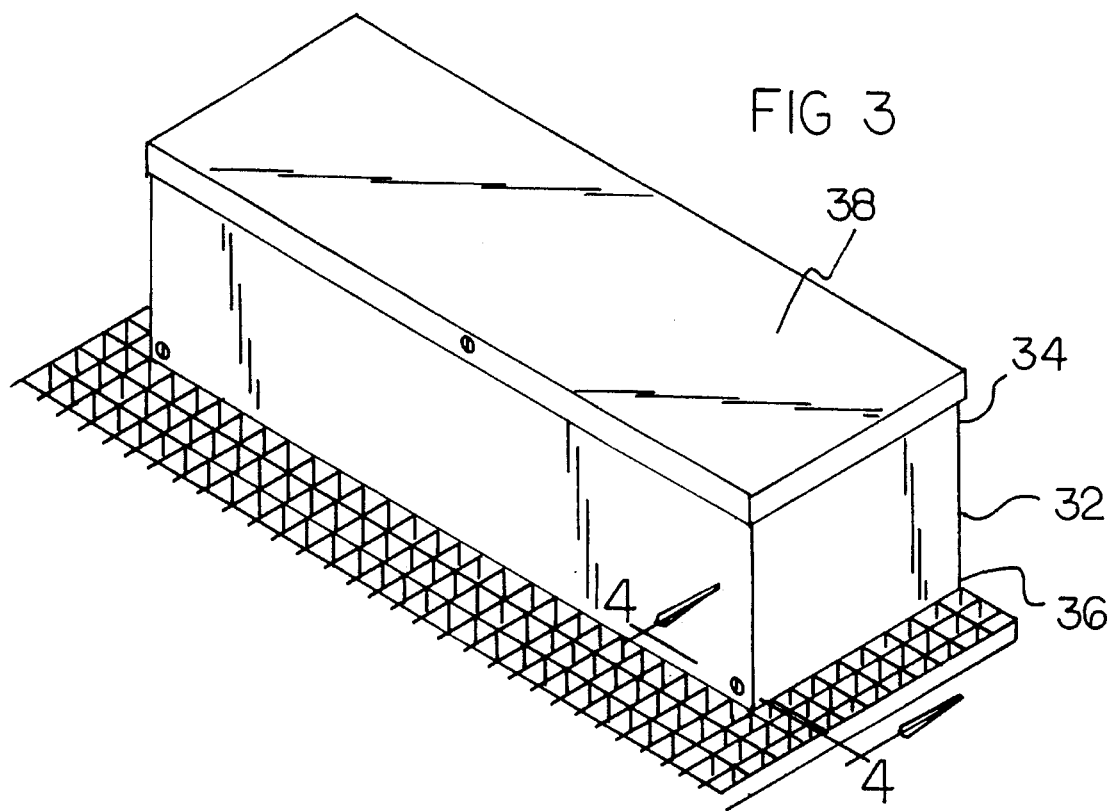
FIG. 3 is a perspective view of the tool box coupled with the insert.
Figure 4:
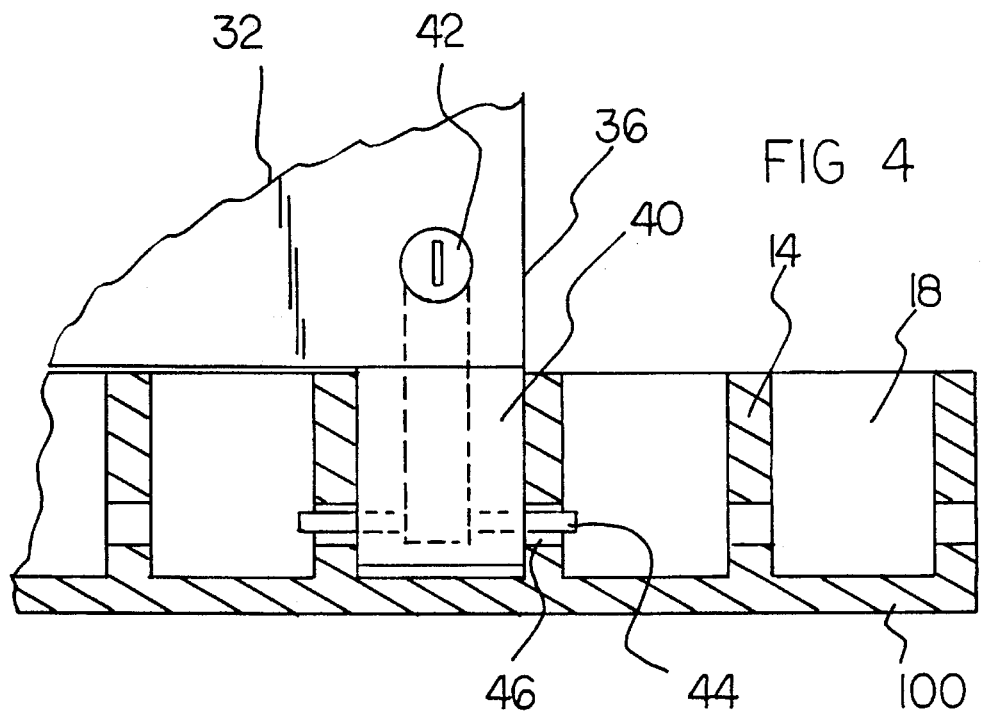
FIG. 4 is a cross-sectional view as taken along line 4—4 of FIG. 3.

The device 10 includes a tool box 32 having an upper surface 34 and a lower surface 36. The tool box 32 is best illustrated in FIG. 3. The upper surface 34 has a lid 38 hingedly secured thereto. The lower surface 36 has lock mechanisms 40 secured to four corners thereof. The lock mechanisms 40 have a key insert 42 through an upper portion thereof. The lock mechanisms 40 are dimensioned to be received within the square openings 18 of the insert 12. The lock mechanisms 40 have lugs 44 selectively extending outwardly of opposing sides of a lower portion thereof to engage slots 46 within a lower portion of the longitudinally 14 extending rib members of the insert 12 for a truck bed 100 whereby the lugs 44 cooperate with the key insert 42 to selectively engage or disengage the slots 46. The lock mechanisms 40 are best illustrated in FIG. 4. The slots 46 could also be further utilized for the use of bungee cords and tie down straps to secure cargo to the grates. The bungee cords or tie down straps could be incorporated into the device 10 or be available separately for a user.

Figure 5:
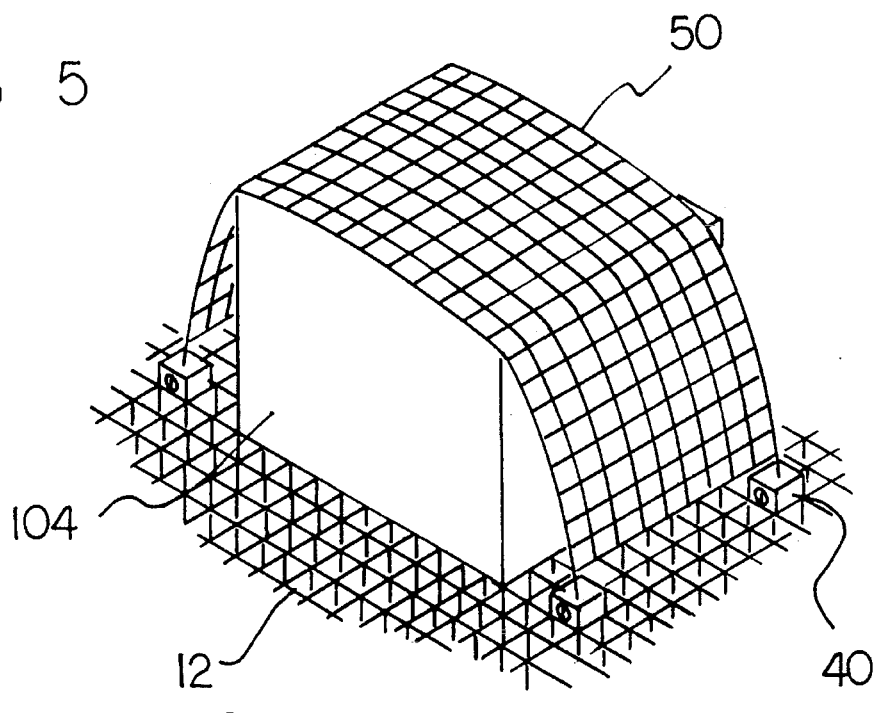
FIG. 5 is a perspective view of the cargo net coupled with the insert.

A cargo net 50 has lock mechanisms 40 secured to four corners thereof. The cargo net 50 is best illustrated in FIG. 5. This illustration displays the cargo net 50 holding a carton 104 in place. The lock mechanisms 40 have a key insert 42 through an upper portion. The lock mechanisms 40 have lugs 44 selectively extending outwardly of opposing sides of a lower portion thereof to engage slots 46 within a lower portion of the longitudinally 14 extending rib members of the insert 12 for a truck bed 100 whereby the lugs 44 cooperate with the key insert 42 to selectively engage or disengage the slots 46.

Figure 6:
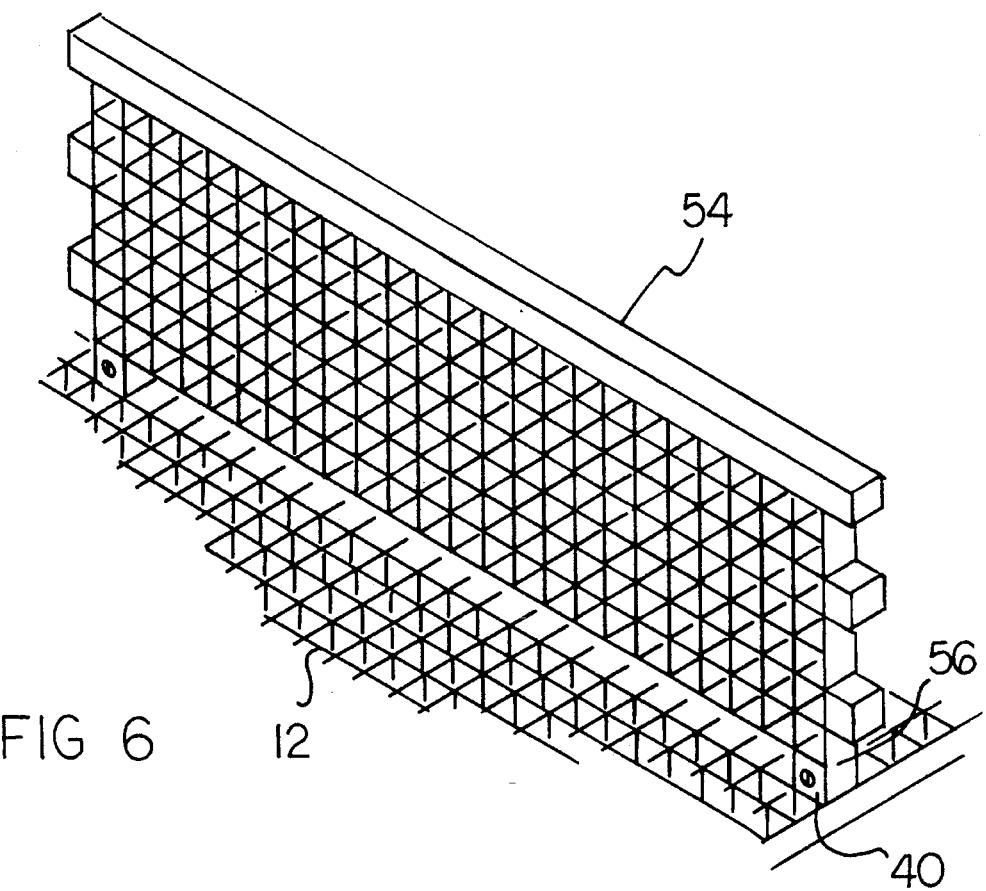
FIG. 6 is a perspective view of the divider wall coupled with the insert.

A divider wall 54 has lock mechanisms 40 secured to lower corners 56 thereof. The divider wall 54 is best illustrated in FIG. 6. The lock mechanisms 40 have a key insert 42 through an upper portion. The lock mechanisms 40 have lugs 44 selectively extending outwardly of opposing sides of a lower portion thereof to engage slots 46 within a lower portion of the longitudinally 14 extending rib members of the insert 12 for a truck bed 100 whereby the lugs 44 cooperate with the key insert 42 to selectively engage or disengage the slots 46.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. An insert for a pickup truck bed for protecting a truck bed from damage while providing a customized storage system comprising, in combination:

a truck bed insert comprising a plurality of longitudinally and latitudinally extending rib members, the longitudinally and latitudinally extending rib members together forming a plurality of square openings, the truck bed insert dimensioned to be received within a truck bed of a pickup truck;

a plurality of attachment brackets, each of the attachment brackets having a U-shaped configuration with a pair of outwardly extending flange portions integral with free ends thereof, the attachment brackets adapted for inverted coupling over a segment of the longitudinally rib members of the truck bed insert, the flange portion having apertures formed therethrough for the receipt of securement screws for securement of the truck bed insert within the pickup truck bed;

a tool box having an upper surface and a lower surface, the upper surface having a lid hingedly secured thereto, the lower surface having lock mechanisms secured to four corners thereof, the lock mechanisms having a key insert through an upper portion thereof, the lock mechanisms having lugs selectively extending outwardly of opposing sides of a lower portion thereof to engage slots within a lower portion of the longitudinally extending rib members of the truck bed insert for a truck bed whereby the lugs cooperate with the key insert to selectively engage or disengage the slots;

a cargo net having lock mechanisms secured to four corners thereof, the lock mechanisms having a key insert through an upper portion thereof, the lock mechanisms having lugs selectively extending outwardly of opposing sides of a lower portion thereof to engage slots within a lower portion of the longitudinally extending rib members of the truck bed insert whereby the lugs cooperate with the key insert to selectively engage or disengage the slots;

a divider wall having lock mechanisms secured to lower corners thereof, the lock mechanisms having a key insert through an upper portion thereof, the lock mechanisms having lugs selectively extending outwardly of opposing sides of a lower portion thereof to engage slots within a lower portion of the longitudinally extending rib members of the insert for a truck bed whereby the lugs cooperating with the key insert to selectively engage or disengage the slots.

2. An insert for a pickup truck bed comprising, in combination:

a truck bed insert comprising a plurality of longitudinally and latitudinally extending rib members, the longitudinally and latitudinally rib members together forming a plurality of square openings, the truck bed insert dimensioned to be received within a truck bed of a pickup truck;

a plurality of attachment brackets adapted for securement of the insert within the pickup truck bed;

lock mechanisms having a key insert through an upper portion, the lock mechanisms having lugs selectively extending outwardly of opposing sides of a lower portion thereof to engage slots within a lower portion of the longitudinally extending rib members of the truck bed insert whereby the lugs cooperate with the key insert to selectively engage or disengage the slots.

3. The insert as set forth in claim 2 and further including a cargo net having said lock mechanisms secured to four corners thereof.

4. The insert as set forth in claim 2 and further including a tool box having an upper surface and a lower surface, the upper surface having a lid hingedly secured thereto, the lower surface having said lock mechanisms secured to four corners thereof.

5. The insert as set forth in claim 2 and further including a divider wall having said lock mechanisms secured to lower corners thereof.

6. The insert as set forth in claim 2 wherein each of the attachment brackets has a U-shaped configuration with a pair of outwardly extending flange portions integral with free ends thereof, the attachment bracket adapted for inverted coupling over a segment of the longitudinally rib members of the truck bed insert, the flange portion having apertures formed therethrough for the receipt of securement screws for securement of a truck bed insert within a pickup truck bed.

* * * * *